United States Patent Office 3,031,618
Patented Apr. 24, 1962

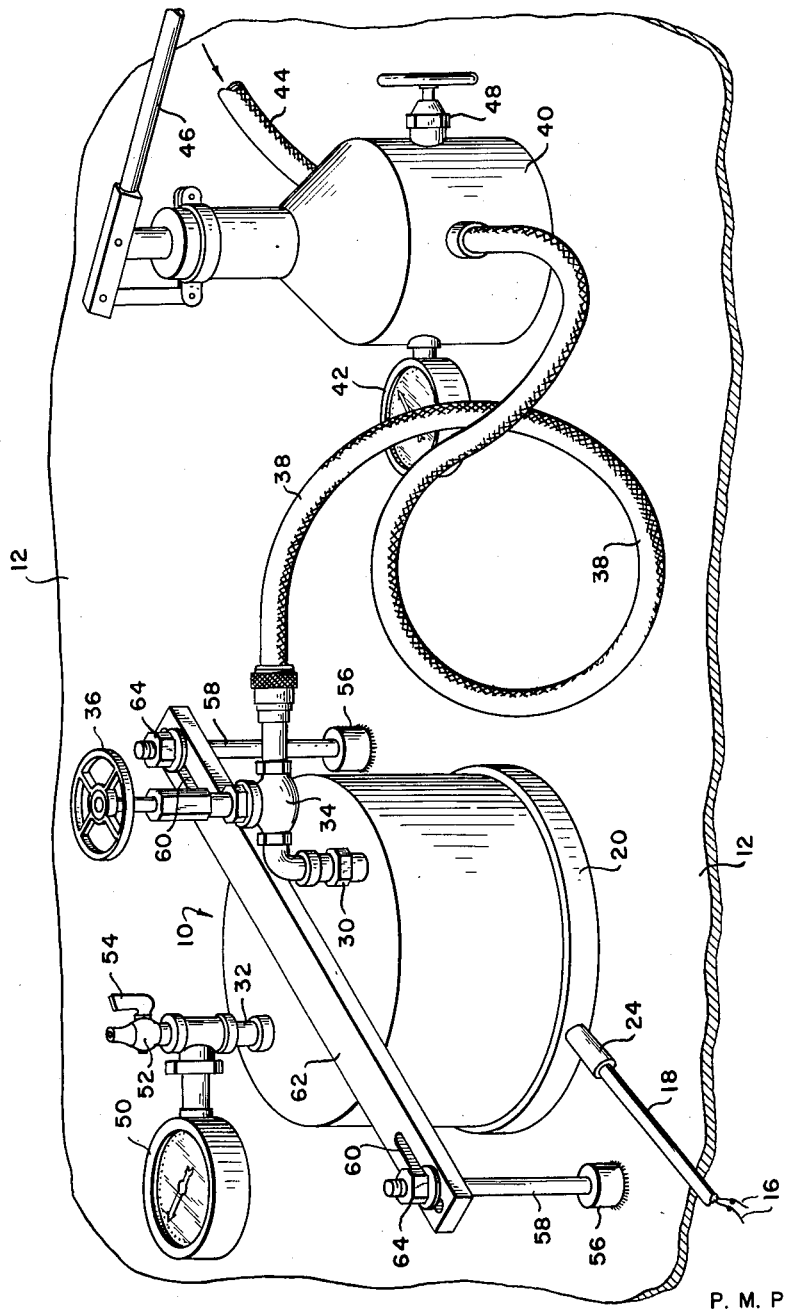

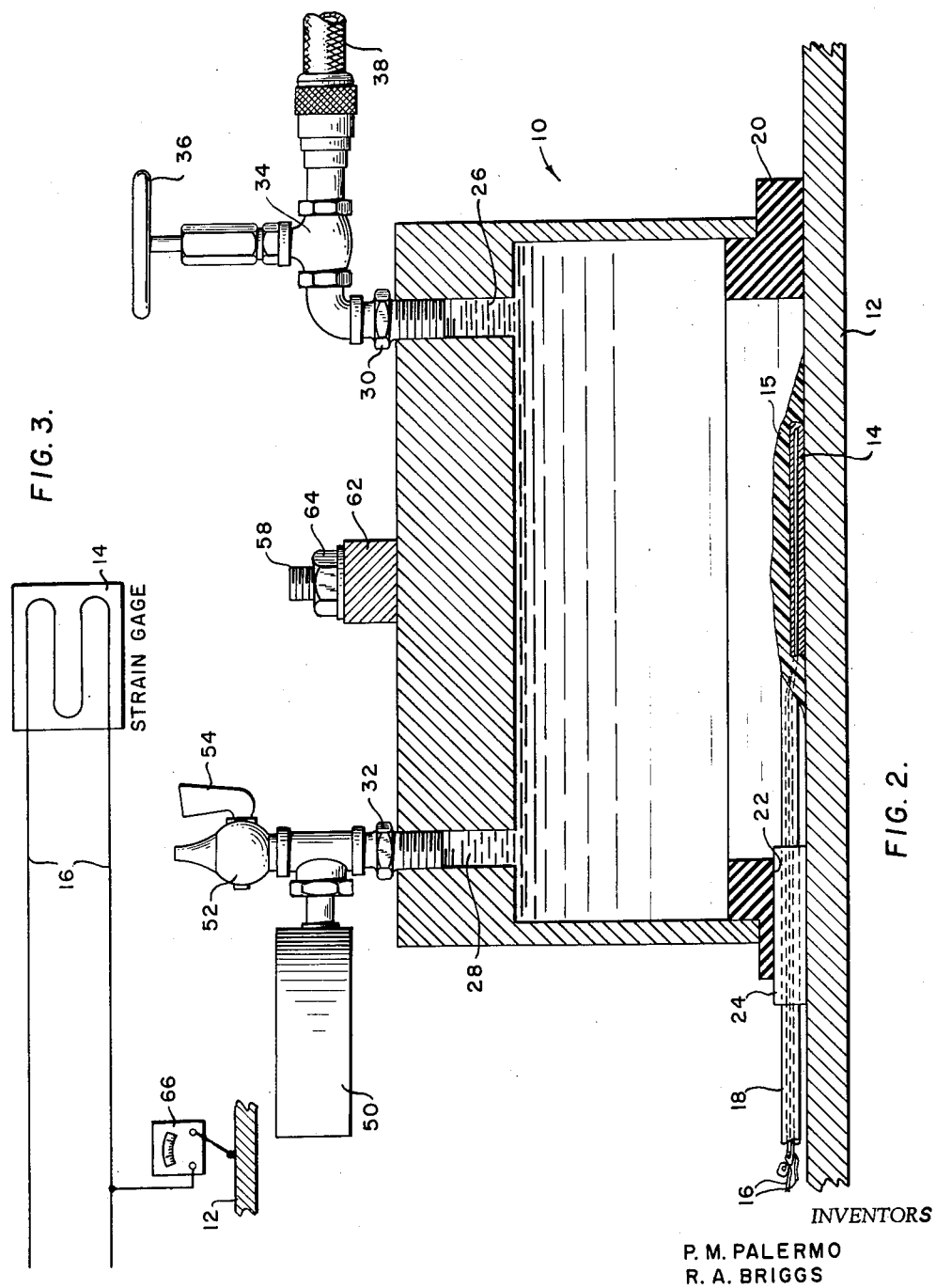

3,031,618
PORTABLE STRAIN GAGE TESTING DEVICE
Peter M. Palermo, Bethesda, Md. (12816 Connecticut Ave., Wheaton, Md.), and Robert A. Briggs, 8615 Falls Road, Bethesda 14, Md.
Filed June 23, 1959, Ser. No. 822,401
10 Claims. (Cl. 324—65)
(Granted under Title 35, U.S. Code (1952), sec. 266)

The invention described herein may be manufactured and used by or for the Government of the United States of America for governmental purposes without the payment of any royalties thereon or therefor.

This invention relates to a means for applying water, under pressure, to a localized area on either a flat or curved surface, and more particularly to a means for determining, in the field, the effectiveness of waterproofing compounds applied to SR–4 electrical resistance strain gages of the type well known in the art.

In accordance with prior art practice, the effectiveness of waterproofing compounds applied to SR–4 electrical resistance strain gages has of necessity been determined in the field while the gages and the structure to which they are attached are submerged in the water. An example of this operation is the application of the well known strain gages to the exterior of a submarine prior to deep submergence trials and the testing of the waterproofing applied to the strain gages while the submarine is so submerged. One major disadvantage of this technique is that it makes it necessary for the submarine or other vessel to be dry-docked in the event that the waterproofing is found ineffective during trials so that defective gages below the water line or inside tanks may be replaced. In the event that the waterproofing compounds are found to be ineffective, resulting in an excessive leakage resistance to ground on the part of the gage, it is necessary that the submarine or like vessel be dry-docked and the necessary gage repairs be made. It is pointed out that the cost of docking and undocking a submarine, for example, is approximately $4,000, and that the necessary repairs of the gage entails the use of approximately two electricians plus one man to install and waterproof the new gage, at a cost of approximately $100.00 per gage. Thus in the event of ineffective waterproofing, the prior art techniques of applying and testing strain gages on submarines and the like results in excessive repair costs.

In according with the instant invention, an electrical resistance strain gage is cemented to the structure under test and coated with a waterproofing compound. An open ended cylindrical chamber is then affixed to the hull or other structure under test, in strain gage surrounding condition, with a waterproof gasket surrounding the area of contact between the pressure chamber and the hull or the like. The pressure chamber is then filled with water under pressure by means of a portable hydraulic pump attached to the pressure chamber, and the leakage resistance of the gage is then checked at the other end of the cables leading from the gage, by means of a megohmmeter.

In the event that leakage resistance falls below a specified value, the pressure chamber is removed from gage surrounding position and the waterproof coating and gage are replaced and the test repeated until a satisfactory waterproof coating is obtained. It is emphasized that the instant apparatus is adapted to be applied while the submarine or other ship is in dry-dock for the first time when the gages are first applied to the hull thereof, thereby eliminating the necessity for testing the coating on the strain gages during deep submergence trials or other sea trials of a like nature. This technique eliminates the necessity for repeating the initial dry-docking operation, thus materially reducing the cost of trials on submarines or the like to a very material extent, since as pointed out above, the cost of dry-docking a submarine is approximately $4,000 and the cost of repairing or replacing each of the gages is approximately $100.00. By using the pressure chamber produced in accordance with this invention, when a gage is found to have faulty waterproofing, it is only necessary to cut the cable and replace the gage at a cost of approximately $20.00 per gage. Thus in total, there is a saving of the second dry-docking ($4,000.) and approximately $80.00 per gage. The instant structure is portable and weighs only approximately ten pounds thus being readily adapted for use in the field.

It is accordingly an object of this invention to provide a means for testing the effectiveness of waterproofing compounds applied to an SR–4 electrical resistance strain gage that overcomes the inherent disadvantages of the prior art as enumerated above.

Another object of this invention is to provide a portable means for determining the effectiveness of waterproofing compounds applied to an electrical resistance strain gage.

A further object of this invention is to provide a means for simulating the effects of water under pressure upon a waterproofing compound applied to an electrical resistance strain gage.

Still another object of this invention is to provide a means adapted to be attached to a ship's hull for determining the effectiveness of waterproof compounds applied to an electrical resistance strain gage attached to said hull.

An added object of this invention is to provide a means that eliminates the need for repeated dry-docking of a ship for the purposes of repairing and/or replacing electrical resistance strain gages attached to the exterior of the hull of said ship.

Still an added object of this invention is to provide a means for applying water under pressure against a localized area on a ship's hull for the purposes of determining the effectiveness of a waterproofing compound applied to an electrical resistance strain gage attached to said hull.

Another object of this invention is to provide a method for testing the effectiveness of a waterproofing compound applied to an electrical resistance strain gage affixed to the exterior of a ship's hull without actually placing the entire gage covered portion of the hull in the water.

Other objects of this invention will be readily appreciated as the same becomes better undersood by reference to the following detailed description when considered in connection with the accompanying drawings, wherein:

FIG. 1 is a prespective view, partially broken away, of a portable pressure chamber and auxiliary equipment used therewith as constructed in accordance with this invention;

FIG. 2 is a transverse sectional view, partially broken away of the pressure chamber shown in FIG. 1; and FIG. 3 is a schematic wiring diagram showing the manner of testing a strain gage in accordance with the instant invention.

Referring now to the drawings wherein like reference characters designate like or corresponding parts throughout the several views, there is shown in FIG. 1 a portable pressure chamber 10 removably attached to a ship's hull 12 for example, in enclosing relation about an electrical resistance strain gage 14 of the type commonly designated as SR–4 and which is well known in the testing art. The strain gage 14 is cemented to the hull or the like 12 in a conventional manner, and is then covered with any desirable water-proofing compound 15.

The strain gage 14 is provided with two or more electrical leads 16 extending outwardly therefrom within a shield 18. The chamber 10 is separated, at its lower edge, from the hull or like structure 12 by an annular rubber gasket 20 having a hole 22 formed therein through which the electrical leads 16 are adapted to extend to the exterior of the chamber 10. The point at which the leads 16 and their shield 18 passed through the hole 22 in the gasket 20 is sealed by wrapping the shield 18 with a plurality of turns of rubber adhesive tape 24, such as the type commonly sold under the trade name Okonite. The tape 24 is built up around the shield 18 to the extent necessary to provide a watertight seal between the leads 16 and the gasket 20.

It is emphasized that the chamber 10 may be applied to curved as well as flat surfaces by suitable shaping of the gasket 20.

The chamber 10 is provided with a pair of openings 26 and 28 respectively that extend through the closed end of the chamber. Each of the holes 26 and 28 is threaded adjacent the exterior end thereof and has mounted therein a threaded pipe fitting 30 and 32 respectively. The pipe fitting 30 has attached thereto a selectively closable valve 34 having a closing handle 36. The valve 34 is in turn provided with suitable fittings adapted to receive, in watertight relation therewith, a length of hose 38. The hose 38 in turn has its opposite end connected to the discharge end of a hydraulic pump 40, which is provided with a conventional pressure gage 42. The pump 40 is further provided with another length of hose 44 which extends to any convenient source of water whereby water is fed to the pump.

It is emphasized that the pump 40 is of a conventional hydraulic type and is provided with a pump handle 46. The pump 40 allows through the opening of a valve 48, the flow of water directly from the hose 44, through the hose 38 and into the chamber 10, when the valve 34 is open. The precise manner in which the pump 40 is utilized in the instant invention will be hereinafter described in greater detail.

The chamber 10 is further provided with a conventional Bourdon pressure gage 50 attached to the pipe fitting 32. The gage 50 is in turn provided with a stopcock 52 which, by suitable adjustment of a handle 54 thereon, is adapted to allow fluid to flow directly through the fitting 32 and out of the chamber 10. By turning the handle 54 to an alternate position fluid is applied to the gage 50 so as to measure the fluid pressure in the chamber 10.

It is of course emphasized that the chamber 10 must be held tightly clamped against the gasket 20 and the hull or the like 12. For this purpose, one approach is to provide the structure shown in FIGS. 1 and 2. To be more specific, the hull has affixed thereto a pair of diametrically spaced bosses 56 which are welded or otherwise firmly attached to the hull 12. The bosses 56 are each drilled and tapped to each receive one end of a stud 58 which has the opposite ends thereof threaded. The other end of each stud 58 extends through a slot 60 in the respective ends of a clamp-down bar 62. The bar 62 is tightly clamped against the chamber 10 so as to hold the same firmly against the hull 12 by the application of a nut 64 to the free, threaded end of each of the studs 58, each of said nuts in turn being tightened down against the bar 62 until it presses the chamber 10 with sufficient tightness against the gasket 20 and the hull 12. In the event that a single clamp-bar 62 proves inadequate to hold down the chamber 10, a plurality of such sets of bars and bolts 58 may be utilized.

Operation

In utilizing the instant invention the chamber 10 is clamped to the hull 12 and the valves 48, 34 and 52 are each first opened and water is allowed to flow through the hoses 44 and 38 through the pump 40 and into the chamber 10 until the chamber fills and water commences to flow out of the stop-cock 52, at which time the stopcock 52 and the valve 48 are both closed while the valve 34 remains open.

At this time the pump handle 46 is pressed downwardly thereby applying pressure to the fluid in the pump 40 and therefore also on the fluid within the chamber 10. This pressure is indicated on the gages 42 and 50 respectively. The pressure is applied until a desired pressure level is read on the gages 42 and 52.

In the course of normal test operations the pressure within the chamber 10 is raised to approximately 125 to 150 p.s.i. It has been found that if there is faulty waterproofing, a pressure of 125–150 p.s.i. is sufficient to detect it, and if a gage is satisfactory at this pressure, 99% of the time it will be satisfactory at deep water pressures of as high as 1000 p.s.i.

With the pressure within the chamber 10 at the desired level, the leakage resistance of the strain gage 14 is now measured by connecting a megohmmeter 66 between one of the leads 16 of the strain gage 14, and the hull 12 in the manner shown schematically in FIG. 3. In this manner the leakage resistance of the gage 14 may be determined while the waterproof coating on the strain gage 14 has applied thereto a pressure substantially the same as that to which it will be subjected in actual field trials. In the event that the leakage resistance of the pressurized strain gage 14 is found to be unsatisfactory, the waterproof coating 15 and/or the entire gage may be removed and replaced with another gage and another layer of waterproof coating, and the above tests repeated.

Thus the instant invention provides a relatively simple and inexpensive apparatus for pretesting the effectiveness of waterproofing compounds applied to electrical resistance strain gages, which have in turn been cemented to a submarine hull or the like while said submarine or the like is still in dry-dock and before it is actually placed in deep water.

As set forth previously, the instant apparatus provides a means which eliminates the necessity of repeated drydocking of a ship, such as a submarine or the like, for the purposes of removing faulty strain gages which have been attached to the exterior of the hull thereof. As indicated above the instant invention results in a saving of substantial sums of money.

It should be understood of course, that the foregoing disclosure relates to only a preferred embodiment of the invention and that numerous modifications or alterations may be made therein without departing from the spirit and scope of the invention as set forth in the appended claims.

What is claimed is:

1. An apparatus for testing the effectiveness of a waterproof coating on an electrical resistance strain gage attached to an outer surface of a structure under test comprising, a chamber having one end open and the opposite end closed, removable clamping means connectable between said surface and said chamber for holding said chamber against a relatively small area of said surface in gage enclosing relation with the open end thereof juxtaposed to said surface, means for admitting water into said chamber to place said gage in contact with water, means for increasing the pressure of the water within the chamber upon said surface and a means for determining the electrical leakage resistance of said strain gage while said enclosure is filled with water under pressure.

2. An apparatus for testing the effectiveness of a waterproof coating on an electrical resistance strain gage attached to a surface of a structure under test comprising, a chamber having one end open and the opposite end closed, removable clamping means connectable between said surface and said chamber for holding said chamber against a relatively small area of said surface in gage enclosing relation with the open end thereof juxtaposed to said surface, means for admitting water into said chamber to place said gage in contact with water, means for increasing the pressure of the water within the chamber upon said surface, a pressure gage attached to said chamber, said pressure gage being in communication with the interior of said chamber, and a means for determining the electrical leakage resistance of said strain gage while said enclosure is filled with water under pressure.

3. An apparatus for testing the effectiveness of a waterproof coating on an electrical resistance strain gage attached to an outer surface of a water submergible structure under test comprising, a chamber having one end open and the opposite end closed, removable clamping means connectable between said surface and said chamber for holding said chamber against said surface in gage enclosing relation with the open end of the chamber juxtaposed to said surface, means for admitting water into the volume enclosed between said chamber and said surface to place said gage in contact with water, means for increasing the pressure of the water within the chamber upon said surface, a hydraulic pump connected to the interior of said chamber whereby the pressure of the fluid within said chamber may be selectively increased to simulate the effect of deep water submergence pressures upon said gage, and a means for determining the electrical leakage resistance of said strain gage while said enclosure is filled with water under pressure.

4. An apparatus for testing the effectiveness of a waterproof coating on an electrical resistance strain gage having a plurality of electrical leads and being attached to a surface of a structure under test, comprising, a chamber having one end open and the opposite end closed, clamping means for holding said chamber against said surface in gage enclosing relation with the open end thereof juxtaposed to said surface, a waterproof gasket surrounding the edge of the open end of said chamber and interposed between said chamber and said surface, said electrical leads extending through said gasket in watertight relation therewith, means for admitting water into said chamber to place said gage in contact with water, means for increasing the pressure of the water within the chamber upon said area of the surface to simulate the effect of deep water submergence pressures upon said gage, and an ohmmeter connected between one of said leads and said structure, whereby the electrical leakage resistance of said strain gage to the structure may be determined while the chamber is filled with water under pressure.

5. An apparatus for simulating the effects of deep water submergence pressures upon an electrical resistance strain gage attached to an outer, water-submergible surface of a ship by applying a simulated pressure to a localized area of said surface of the ship while said ship is out of the water comprising, a cup-shaped chamber having one end open and the opposite end closed, clamping means connectable between said surface and said chamber for holding said chamber against said surface in gage enclosing relation with the open end of the chamber juxtaposed to said surface thereby forming an enclosed volume about said strain gage, means for admitting water into the volume enclosed between said chamber and said surface to place the strain gage in contact with water, means for increasing the pressure of the water within the chamber upon said surface to simulate the effects of deep submergence upon said surface, a pump connected to the interior of said chamber for selectively varying the pressure of the fluid within said chamber and thereby the pressure of said fluid upon said surface and strain gage, and a means for determining the electrical leakage resistance of said strain gage while said enclosure is filled with water under pressure.

6. An apparatus as defined in claim 5, wherein said clamping means comprises, a member removably connected to said chamber, means extending from said member toward the surface of said ship and connectable to both said member and said surface.

7. An apparatus as set forth in claim 5, wherein said clamping means includes a removable bar extending transversely of, and in surface contact with the exterior of the closed end of said chamber, a rod removably and adjustably connected to each end of said bar, each of said rods extending toward the surface of said ship and adjustably and removably connected to said surface.

8. An apparatus as defined in claim 7 further including a plurality of internally threaded bosses affixed to said surface to removably receive an end of each of said rods.

9. A system for simulating underwater pressure effects on a localized area of an outer surface of a ship's hull comprising, a chamber having one end open and the opposite end closed for enclosing said area on the surface, removable clamping means connectable between said surface and said chamber for holding said chamber against said surface with the open end thereof juxtaposed to said surface, said clamping means including a removable bar extending transversely of and in surface contact with the exterior of the closed end of said chamber, a rod removably and adjustably connected to each end of said bar, each of said rods extending toward the surface of said ship and adjustably and removably connected to said surface; said system further comprising means for introducing water into said chamber including a fluid conduit line attached to said chamber and being in communication with the interior thereof to place water in contact with said surface, and a hydraulic pump in said fluid conduit line for applying pressure to the fluid within said chamber.

10. The invention as defined in claim 9 and further including a plurality of internally threaded bosses affixed to said surface to each removably receive an end of each of said rods.

References Cited in the file of this patent

UNITED STATES PATENTS

| | | |
|---|---|---|
| 358,056 | Mullen | Feb. 22, 1887 |
| 2,521,079 | Morris | Sept. 5, 1950 |
| 2,535,998 | Bierman | Dec. 26, 1950 |
| 2,568,199 | Martinet | Sept. 18, 1951 |